United States Patent [19]

Hidalgo et al.

[11] 4,303,580

[45] Dec. 1, 1981

[54] METAL CASEINATES

[75] Inventors: Jaime Hidalgo; Valentin Wenner; Françoise Forni, all of La Tour-de-Peilz, Switzerland

[73] Assignee: Societe d'Assistance Technique pour Produits Nestle S.A., Lausanne, Switzerland

[21] Appl. No.: 119,022

[22] Filed: Feb. 6, 1980

[30] Foreign Application Priority Data

Feb. 9, 1979 [CH] Switzerland ...................... 12697/79

[51] Int. Cl.$^3$ ............................................... A23J 1/20
[52] U.S. Cl. .................................... 260/113; 106/146; 260/114; 260/115; 260/119; 260/120; 426/580; 426/657
[58] Field of Search ............... 260/113, 114, 115, 119, 260/120; 106/146

[56] References Cited

U.S. PATENT DOCUMENTS

| | | | |
|---|---|---|---|
| 898,311 | 9/1908 | Busett | 260/113 |
| 972,523 | 10/1910 | Fischer | 260/115 |
| 1,025,466 | 5/1912 | Hoering et al. | 260/115 |
| 2,103,153 | 12/1937 | Dunham | 260/119 X |
| 2,401,919 | 6/1946 | Ender | 260/115 UX |
| 2,721,861 | 10/1955 | Paterson | 260/113 |
| 2,849,334 | 8/1958 | Hart | 260/115 X |
| 2,945,783 | 7/1960 | Beekman et al. | 260/121 X |
| 3,234,001 | 2/1966 | Gaiser | 260/119 UX |
| 3,705,143 | 12/1972 | Mourey et al. | 260/120 |
| 4,075,196 | 2/1978 | Badertscher et al. | 260/120 |
| 4,209,544 | 6/1980 | Zauagli et al. | 260/120 X |

Primary Examiner—Howard E. Schain
Attorney, Agent, or Firm—Vogt & O'Donnell

[57] ABSTRACT

The invention relates to caseinates of oligo-elements, such as chromium, cobalt, copper, tin, iron, magnesium, manganese, molybdenum, nickel, silicon, vanadium and zinc, containing, for n times 100 grams of casein, from 3 to 100 milli-ion-grams of $M^{n+}$, where M represents the oligo-element(s) and n is an integer.

The caseinates are prepared from casein by ion exchange in order to introduce the oligo-element(s) therein, followed by washing until a substantially constant composition is obtained. They may also be obtained from alkali metal caseinates.

The caseinates of copper or iron may be used as a source of copper or iron with no catalytic activity on oxidation, particularly in infant and dietetic products.

5 Claims, No Drawings

METAL CASEINATES

This invention relates to oligo-element caseinates. More particularly the invention relates to caseinates of oligo-elements which have the property of dissolving or dispersing in water and of forming, like milk, micellar colloidal suspensions. The invention also relates to the production and use of these caseinates.

Various products inaccurately referred to as "caseinates" are known, being obtained by precipitating casein from milk with the aid of metal salts. Not only are these products insoluble or very sparingly soluble, but the method by which they are obtained indicates that they are in fact irregular mixtures of caseins and several ionic entities which are complexed with one another to a greater or lesser extent. Other products are also known which are obtained by amalgamating casein and metal salts in the paste phase. The same remarks apply to these known products also.

By contrast, an object of the present invention is to provide better controlled chemical compounds in which the metallic elements are reliably bound to the casein. These compounds, which will be referred to hereinafter as "caseinates of oligo-elements", are characterised by the fact that, for n times 100 g of casein, they contain from 3 to 100 milli-ion-grams of $M^{n+}$, in which M represents the oligo-element(s) and n is an integer. They preferably contain from 10 to 20 milli-ion-grams of $M^{n+}$ for n times 100 g of casein.

Commensurate with its representation by the symbol $M^{n+}$, the oligo-element(s) of the caseinates in question should of course have a metallic character (possible formation of cations).

An oligo-element may be defined as a chemical element present in small quantities, even traces, in an organism to which it is sometimes indispensable. In other words, the present invention is concerned with the caseinates of chemical elements of the periodic classification whch are metallic in character, with the exception of true alkali and alkaline-earth metals (calcium and higher homologs). Purely by way of illustration, reference is made, in alphabetical order, to chromium, cobalt, copper, tin, iron, magnesium, manganese, molybdenum, nickel, silicon, vanadium and zinc; for example:

| Casinates of $M^{n+}$ | Milli-ion-grams per 100 g of casein | Percent by weight (in round figures) |
|---|---|---|
| Caseinates of copper | 3 to 100 from cuprous Cu | 0.2 to 6 |
| Caseinates of copper | 1.5 to 50 from cupric Cu | 0.1 to 3 |
| Caseinates of iron | 1.5 to 50 from ferrous Fe | 0.08 to 2.8 |
| Caseinates of iron | 1 to 33 from ferric Fe | 0.06 to 1.8 |
| Caseinates of cobalt | 1.5 to 50 | 0.08 to 2.9 |
| Caseinates of magnesium | 1.5 to 50 | 0.04 to 1.2 |
| Caseinates of zinc | 1.5 to 50 | 0.1 to 3.3 |

It is advisable at this juncture to point out that the fact that the oligo-element is in a certain state of oxidation to begin with does not necessarily mean that it ends up in the caseinate exclusively in this same state of oxidation, above all if the caseinate is prepared in the presence of air. It is probable for example that ferrie Fe will be encountered in a caseinate of iron obtained from ferrous Fe in the presence of air.

These caseinates may of course be mixed, for example copper/iron. If desired, they may also contain other ions, particularly of calcium.

In their isolated state, they are present in the form of amorphous powders which may either be white (caseinate of zinc for example) or variously coloured, for example blue for the caseinate of Cu and brown/yellow for the caseinate of Fe. They dissolve or disperse in water to form micelles.

The caseinates of oligo-elements according to the invention may be prepared by treating casein to introduce the oligo-element therein to and washing until the caseinate thus formed has a substantially constant composition.

The casein used may be obtained from milk, in which case it is best to separate it from the other non-protein constituents of the milk, such as fats and lactose. The whey proteins are not troublesome and may be retained with the casein. Accordingly, one convenient method of obtaining this casein is to treat a skimmed milk by ultrafiltration, the treatment preferably being terminated by ultrafiltration with washing (known as diafiltration) to remove most of the lactose and salts. Since the preferred pH for the various operations is in the range from 6.5 to 7.0, it may be necessary to adjust the pH of the casein solution thus prepared.

According to one embodiment, based on indirect ion exchange, the casein solution is contacted with a cation exchange resin charged with alkali metal ions, for example potassium or sodium, whereafter a solution of the oligo-element is added to the alkaline caseinate thus formed. The mixture is then subjected to ultrafiltration, the alkali metal ions being eliminated in the permeate to the benefit of the oligo-element which is fixed to the casein. The ultrafiltration step may be accompanied by washing or dilution (in which case it becomes diafiltration) and may thus be advantageously combined with the final washing operation.

Alternatively, it is possible to start directly with a solution of alkali caseinate and proceed as above, adding the oligo-element. Caseinates such as these are readily obtainable in the manufacture of cheese or casein where the casein is precipitated from the milk by biological or chemical acidification, enzymatically or by saturation of the ionic charge. Suitable neutralisation with an alkali gives the alkaline caseinate.

Irrespective of the method by which the oligo-element caseinate is formed, the solution of the oligo-element is slowly added with stirring in a measured quantity in order to remain as close as possible to a state of equilibrium. This avoids any significant precipitation and, consequently, any risk of disruption of the integrity of the caseinate through fractionation. Preparation is terminated by washing until a substantially constant composition is obtained, i.e. until the losses of oligo-element, by way of asymptotic reduction as a function of the washing time, cannot be detected by analysis or, in practice, represent only a negligible percentage of the fixed oligo-element. This washing operation is carried out by ultrafiltration and, above all, by diafiltration and/or by dialysis. It will be recalled that, in the embodiment based on indirect exchange, this washing operation may be carried out in combination with the ultrafiltration step which eliminates the alkali metal ions to the benefit of the oligo-element.

It is also possible to carry out only partial washing, for example by diafiltration, and then to dry the oligo-element caseinate, in particular by freeze-drying. Before use, the powder, redissolved, will advantageously be subjected to complementary washing, for example by dialysis.

The preparation methods may be modified by introducing calcium into the casein in addition to the oligo-element before the final washing operation.

The casein solution is brought into contact with the cation exchange resin either by suspending the resin in the solution or by passing the solution through a column filled with resin.

In the first case, the solid and liquid phases are separated by siphoning, filtration or centrifuging.

The caseinates of oligo-elements according to the invention, which may be obtained in powder form by drying (freeze-drying, etc.), have remarkable properties. The oligo-element normally remains assimilable and, in some cases, is even more assimilable than in its mineral salt form, although many of its technologically undesirable secondary effects are inhibited.

For example, copper which is known for its nutritional value is frequently added to liquid or powder-form infant or dietetic products. In either case, it catalyses oxidation if added in the form of conventional derivatives (for example $CuCl_2$) and, in the interests of stability in storage, every trace of oxygen has to be purged from the products in which it is present. By contrast, the caseinate of copper is substantially neutral from this point of view. Accordingly, it constitutes a "non-catalytic" source of copper.

The same applies to the caseinate of iron which is a "non-catalytic" source of iron in contrast to the derivatives normally used, again for nutritional reasons (particularly in cereals), which catalyse oxidation, as is the case with ferrous sulphate for example.

Some of the caseinates according to the invention are illustrated by the following Examples in which the percentages are expressed by weight unless otherwise indicated.

EXAMPLE 1

1 liter of skimmed milk is centrifuged for 30 minutes at 2000 G in order to eliminate most of the residual fat. This milk is then pasteurised for 30 minutes at 63° C. After cooling to 20° C., a bacteriostatic agent, in the present case 0.02% of $NaN_3$, is added. The milk is then ultrafiltered by washing with 5 times its volume of distilled water in an Amicon laboratory ultrafiltration (UF) module, model CEC 1, equipped with a Schleicher & Schull pH 79/1 filter membrane in order to remove the lactose and the mineral salts. Finally, the pH of the solution containing casein and other lactic proteins is adjusted to 6.7.

This casein solution is subjected to a batch treatment with Amberlite IR-120 ion exchange resin which has previously been charged with potassium cations. The mixture thus formed is then stirred for 3 hours at 20° C., after which the protein is separated from the Amberlite by filtration. 3.5 millimoles of copper (5% solution of $CuCl_2$) are then introduced very slowly, followed by slow stirring for 1 hour. After centrifuging for 30 minutes at 2000 G, the supernatant phase is washed in the same way as before in an Amicon ultrafiltration module and then freeze-dried. A caseinate of copper containing 0.6 g of Cu per 100 grams of product (10 millimoles/100 grams) is obtained. The product thus obtained is a blue/green powder which contains:

| copper | 0.45% |
| --- | --- |
| residual calcium | 0.06% |
| total nitrogen | 11.5% |
| water | 0.48% |

This copper caseinate gives micelles on dissolution in water.

EXAMPLE 2

The procedure is as described in Example 1, except that, after the addition of 3.5 millimoles of Cu and slow stirring for 1 hour, 5 millimoles of Ca (5% solution of $CaCl_2$) are slowly added, followed by very slow stirring for 1 hour.

The rest of the operations takes place in the same way as described in Example 1. After freeze-drying, the copper caseinate powder obtained contains:

| copper | 0.51% |
| --- | --- |
| total calcium | 2.98% |
| total nitrogen | 12.61% |
| water | 0.9% |

After the product has been dispersed in water, a micellar suspension is obtained which has a structure similar to that of the casein obtained from fresh milk, as may be confirmed by microphotographs. This copper caseinate has a remarkably weak catalytic effect on the autoxidation of edible lipids, as shown in Examples 4 and 5.

EXAMPLE 3

A copper caseinate is directly prepared from a purified sodium (or potassium) caseinate.

After dissolution, this alkaline caseinate is directly treated with a 5% solution of $CuCl_2$ to obtain a copper caseinate containing 1.76% of copper and then with a 5% solution of $CaCl_2$. Preparation is terminated in the same way as described in Example 1.

A copper caseinate comparable with that of Example 2 is thus obtained, giving typical micelles; it is however slightly richer in copper than that of Example 2.

EXAMPLE 4

The catalytic properties of the copper caseinates of Examples 1 and 2 are determined by an oxidation test on fats.

This test comprises measuring the induction time required to fix oxygen to the unsaturated fatty acids of the fats. This was done in an Astell apparatus with a 4 g sample of lactic butter containing 1 ppm of added copper in an oxygen atmosphere. The incubation times were measured at 90° C. and at 100° C. The results of these tests are set out in the following Table:

| Sample | Induction time in hours | |
| --- | --- | --- |
| | 90° C. | 100° C. |
| pure lactic fat (control) | 18 | 8.2 |
| + sodium caseinate (control) | 14 | 6.8 |
| + copper caseinate of Example 1 containing 0.45% of Cu | 15 | 6.9 |
| + copper caseinate of Example 2 containing 0.51% of Cu | 11 | 5.5 |

-continued

| Sample | Induction time in hours | |
|---|---|---|
| | 90° C. | 100° C. |
| + cupric chloride (control) | 5 | 2.4 |

This Table shows that, in the presence of copper caseinate, the induction times are comparable with those of the fat samples containing no added copper. By contrast, the short induction time of the sample containing added copper in the form of copper chloride reflects the high catalytic activity of the copper which is not fixed to the casein.

EXAMPLE 5

The weak catalytic activity of the copper caseinate of Example 2 is listed by storing a liquid dietetic product containing emulsified vegetable fats. The composition of the dry matter of this product is as follows:

| fats | 26% |
|---|---|
| lactic proteins | 13% |
| lactose | 56% |
| mineral salts | 5% |
| The end product contains: | |
| solids | 15% |
| fats composed of: | |
| lactic fat | 60% |
| palm olein | 24% |
| coconut oil | 8% |
| soya oil | 8% |

The copper is added to the product in an amount of 0.23 ppm incorporated in the mixture before heat treatment at 150° C., followed by flash-cooling before aseptic packaging. The storage test is carried out on the product filled in 250 g bottles at 3 storage temperatures, namely; (1) ambient temperature, i.e. 20° C., (2) 30° C. and (3) 37° C. After only 1 month at 37° C., the control sample containing added copper in the form of cupric chloride is heavily oxidised and inedible, whereas the sample containing added copper in the form of copper caseinate is similar to the control without added copper. These last two samples are good from the storage point of view.

On completion of the test after 3 months at normal temperature and at 30° C., the results set out in the following Table are obtained:

| Dietetic product | Organoleptic examination after 3 months | |
|---|---|---|
| | Storage at 20° C. | Storage at 30° C. |
| without added copper | normal | slightly cooked taste |
| with copper caseinate | normal | equivalent to the control |
| with cupric chloride | oxidised, inedible | oxidised, inedible |

EXAMPLE 6

An iron caseinate is prepared by the procedure described in Example 1. The solution added after exchange on the potassium-loaded Amberlite is a solution of a ferrous salt, in the present case 5% $FeSO_4$.

After freeze-drying, a caseinate of the following composition is obtained:

| iron | 0.56% |
|---|---|
| residual calcium | 1.15% |
| total nitrogen | 13.47% |
| water | 1.66% |

This iron caseinate gives micelles by reconstitution in water.

We claim:

1. A process for preparing a soluble caseinate of at least one oligo-element containing, for n times 100 grams of casein, from 3 to 100 milli-ion-grams of $M^{n+}$, where M represents the oligo-element(s) and n is an integer, comprising treating an alkali metal caseinate, in solution with a solution of a salt of the oligo-element(s), washing the caseinate thus formed by at least one of ultrafiltration diafiltration and dialysis until the caseinate has a substantially constant composition, and dissolving the caseinate in water to form micelles.

2. A process as claimed in claim 1, wherein the casein is a casein obtained by ultrafiltration of milk.

3. A process as claimed in claim 1, wherein the oligo-element is at least one of chromium, cobalt, copper, tin, iron, magnesium, manganese, molybdenum, nickel, silicon, vanadium and zinc.

4. A process as claimed in claim 1, wherein the alkali metal caseinate is prepared by contacting casein in solution with a cation exchange resin loaded with alkali metal ions.

5. A process as claimed in claim 1 wherein calcium is introduced into the caseinate in addition to the oligo-element(s).

* * * * *

UNITED STATES PATENT AND TRADEMARK OFFICE
CERTIFICATE OF CORRECTION

PATENT NO. : 4,303,580

DATED : December 1, 1981

INVENTOR(S) : Jaime Hidalgo, Valentin Wenner, Francoise Forni

It is certified that error appears in the above—identified patent and that said Letters Patent is hereby corrected as shown below:

Title Page, under the heading "Foreign Application Priority Data", the Swiss priority application number "12697/79" should read --1269/79 --.

Title Page, under the heading "References Cited", the first entry "Busett" should read --Busch--.

Column 2, line 1, "ferrie" should read --ferric--.

Column 6, in the eighth line of claim 1, "ultrafiltration" should read --ultrafiltration,--.

Signed and Sealed this

Second Day of February 1982

[SEAL]

Attest:

Attesting Officer

GERALD J. MOSSINGHOFF

Commissioner of Patents and Trademarks